US012682589B1

(12) United States Patent
Leeson

(10) Patent No.: US 12,682,589 B1
(45) Date of Patent: Jul. 14, 2026

(54) SYSTEMS AND METHODS FOR REAL-TIME ANALYTIC GENERATION OF A SPLAT REPRESENTATION AT DIFFERENT LEVELS-OF-DETAIL

(71) Applicant: Miris, Inc., Culver City, CA (US)

(72) Inventor: William Alexander Leeson, Gothenburg (SE)

(73) Assignee: Miris, Inc., Culver City, CA (US)

( * ) Notice: Subject to any disclaimer, the term of this patent is extended or adjusted under 35 U.S.C. 154(b) by 0 days.

(21) Appl. No.: 19/447,044

(22) Filed: Jan. 13, 2026

(51) Int. Cl.
*G06T 19/20* (2011.01)
*G06T 17/00* (2006.01)

(52) U.S. Cl.
CPC .............. *G06T 19/20* (2013.01); *G06T 17/00* (2013.01); *G06T 2210/36* (2013.01); *G06T 2219/2016* (2013.01)

(58) Field of Classification Search
None
See application file for complete search history.

(56) References Cited

PUBLICATIONS

Wang et al., VolSplat: Rethinking Feed-Forward 3D Gaussian Splatting with Voxel-Aligned Prediction, Sep. 23, 2025, version 1, pp. 1-9 (Year: 2025).*
Cromwell, Robert L., "Efficient Eigenvalues for Visualization", School of Electrical Engineering, Purdue University, 1994, 6 pages, West Lafayette, IN.
Kerbl et al., "A Hierarchical 3D Gaussian Representation for Real-Time Rendering of Very Large Datasets", ACM Trans. Graph, vol. 43, No. 4, Article 62, Jul. 2024, 15 pages.

* cited by examiner

*Primary Examiner* — Robert J Craddock
(74) *Attorney, Agent, or Firm* — Ansari Katiraei LLP; Arman Katiraei; Sadiq Ansari

(57) ABSTRACT

A system and associated methods perform real-time analytic and non-iterative generation of a splat representation at different levels-of-detail (LoDs). The system receives a splat representation of a three-dimensional (3D) asset. The system partitions the 3D space of the splat representation into voxels and determines directions and amounts with which the set of splats within each voxel spread out from a centroid that is derived based on positions of the splats in that voxel. The system defines a substitute splat for each voxel based on the one or more directions and amounts that are determined for the set of splats in that voxel and generates the splat representation at a reduced LoD based on the substitute splat that is defined for each voxel.

20 Claims, 8 Drawing Sheets

Associated with a first
level-of-detail (LoD)

Associated with
a second LoD

Associated with
a third LoD

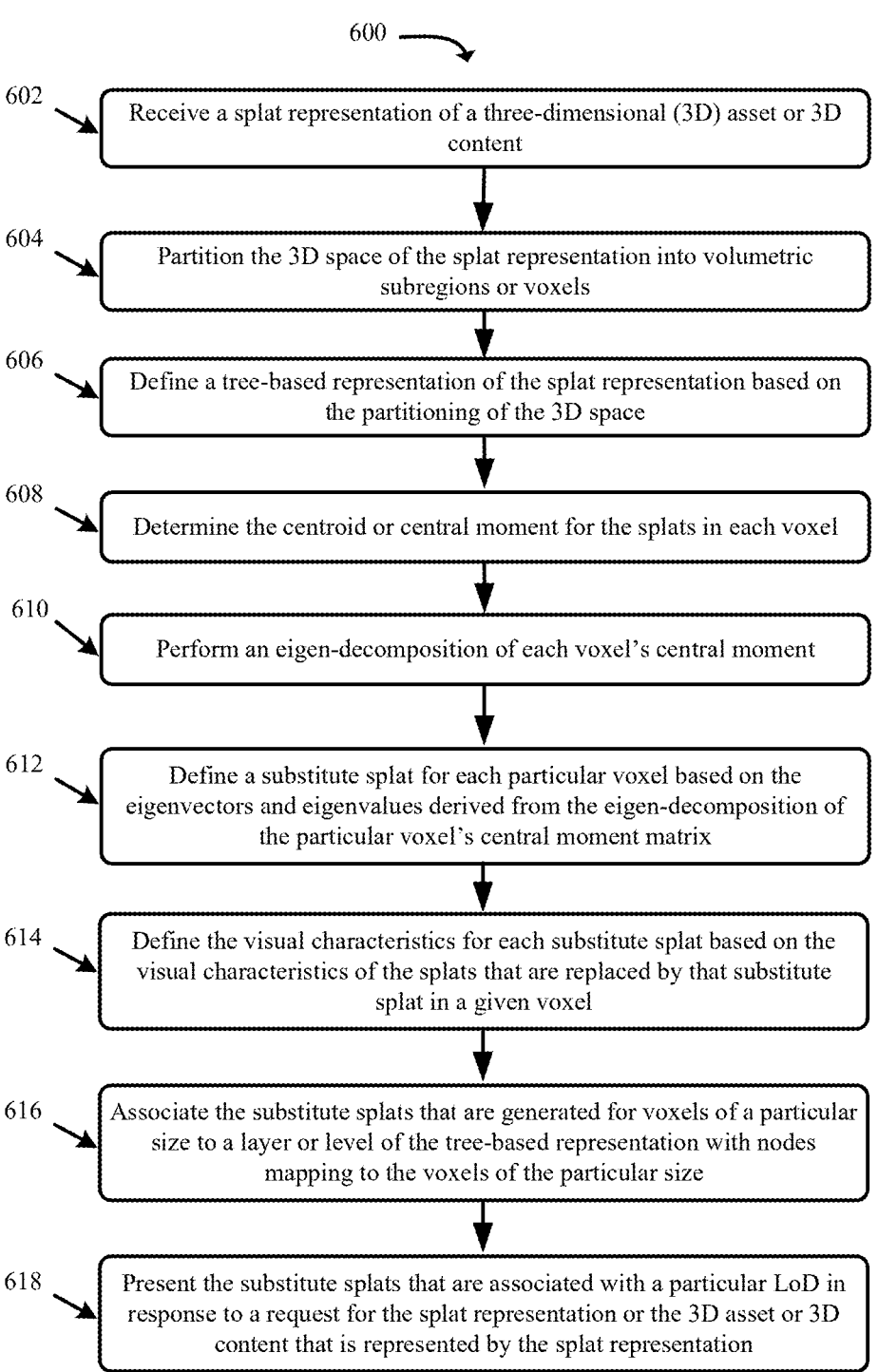

600

602 — Receive a splat representation of a three-dimensional (3D) asset or 3D content 604 — Partition the 3D space of the splat representation into volumetric subregions or voxels 606 — Define a tree-based representation of the splat representation based on the partitioning of the 3D space 608 — Determine the centroid or central moment for the splats in each voxel 610 — Perform an eigen-decomposition of each voxel's central moment 612 — Define a substitute splat for each particular voxel based on the eigenvectors and eigenvalues derived from the eigen-decomposition of the particular voxel's central moment matrix 614 — Define the visual characteristics for each substitute splat based on the visual characteristics of the splats that are replaced by that substitute splat in a given voxel 616 — Associate the substitute splats that are generated for voxels of a particular size to a layer or level of the tree-based representation with nodes mapping to the voxels of the particular size 618 — Present the substitute splats that are associated with a particular LoD in response to a request for the splat representation or the 3D asset or 3D content that is represented by the splat representation

SYSTEMS AND METHODS FOR REAL-TIME ANALYTIC GENERATION OF A SPLAT REPRESENTATION AT DIFFERENT LEVELS-OF-DETAIL

BACKGROUND

Generating a single splat representation for a three-dimensional (3D) content is computationally expensive and time consuming. The splat representation generation involves performing multiple gradient-based training iterations with each iteration optimizing splat parameters (e.g., position, rotation, scale, color, etc.) against reference images according to a loss function. Each iteration may generate a new or modified set of splats that is compared against one or more of the reference images. The iterations are repeated until the generated sets of splats reconstruct the visual detail from the reference images with an acceptable amount of loss. The training is performed anew when generating the splat representation at a different level-of-detail (LoD). Accordingly, there is a need for an analytic and non-iterative approach to generate LoDs directly from a trained high-resolution splat representation, without retraining, while maintaining geometric fidelity and visual similarity.

BRIEF DESCRIPTION OF THE DRAWINGS

FIG. 6 presents a process for generating a splat representation at a lower LoD in accordance with some embodiments presented herein.

DETAILED DESCRIPTION OF PREFERRED EMBODIMENTS

The following detailed description refers to the accompanying drawings. The same reference numbers in different drawings may identify the same or similar elements.

Provided are systems and associated methods for real-time analytic and non-iterative generation of a splat representation at different levels-of-detail (LoDs). A splat generation system receives or generates a high-resolution splat representation of three-dimensional (3D) content, partitions the 3D space of the splat representation into discrete volumetric regions, determines the central moment for the splats within each volumetric region, derives eigenvectors and eigenvalues that characterize the dominant spatial orientation and the scaling of the splats in a given volumetric region, and replaces the splats in each volumetric region with one or more substitute splats that are defined based on the central moment, eigenvectors, and/or eigenvalues (e.g., orientated and scaled according to the eigen structure of the volumetric region). Each LoD encoding of the splat representation may be generated in a single pass and in a fraction of the time needed for the multiple training iterations used by traditional splatting techniques to generate the same LoD encoding of the splat representation.

Through recursive application of this moment-based substitution across hierarchical spatial levels (e.g., an octree, K-dimensional tree, voxel grid, or any clustering or segmentation of the 3D space), the splat generation system generates progressively coarser LoDs in real-time and/or without the delay associated with iterative splat training. The substitute splat generation for each volumetric region may be performed independently and in parallel using different compute units of a graphics processing unit (GPU) or other processor. The generated LoDs preserve the geometric and visual fidelity of the original 3D content while reducing the number of splats by orders of magnitude. Accordingly, the generated LoDs may be used for adaptive streaming of the splat representation, wherein a requesting client device receives the splats defined for the LoD that is appropriate for the client device's bandwidth or processing capability.

Figure 1:
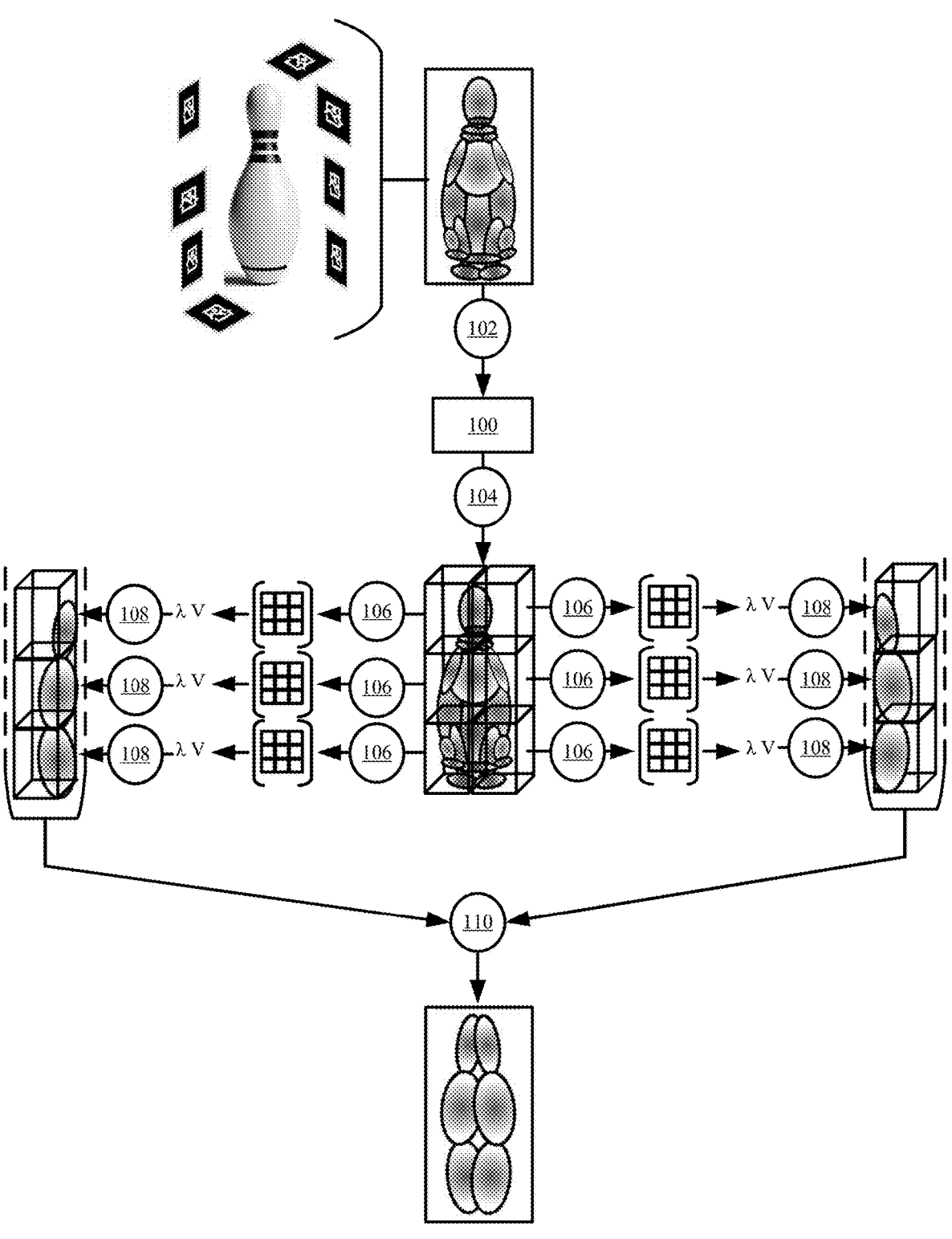
FIG. 1 illustrates an example of the moment-based generation of different levels-of-detail (LoDs) for a splat representation in accordance with some embodiments presented herein.

FIG. 1 illustrates an example of the moment-based generation of different LoDs for a splat representation in accordance with some embodiments presented herein. Splat generation system 100 receives (at 102) a high-resolution splat representation of a 3D asset or 3D content from which splat representations with lesser LoDs are to be generated.

In some embodiments, splat generation system 100 may generate the high-resolution splat representation via an iterative training process. For instance, splat generation system 100 may receive a set of reference images that capture the 3D asset from different angles or perspectives and may iteratively generate or refine different sets of splats until the splats reconstruct the visual detail from the set of reference images with an acceptable amount of loss. Each splat of the high-resolution splat representation may be defined as an anisotropic Gaussian with a position or coordinate in 3D space, a covariance matrix that defines the shape and orientation of the splat, spherical harmonics that define colors and/or other visual characteristics of the splat, and an opacity or alpha value for the splat transparency.

Splat generation system 100 partitions (at 104) the 3D space of the splat representation into one or more sets of progressively smaller sized volumetric regions or voxels. For instance, splat generation system 100 may divide the 3D space into smaller and smaller voxels with each set of voxels of a particular size being associated with a different LoD encoding of the splat representation.

Splat generation system 100 computes (at 106) the central moment of splat positions within each region or voxel. To compute (at 106) the central moment, splat generation system 100 derives a central moment matrix based on the splat positions within a selected region or voxel and solves the central moment matrix to generate eigenvectors and/or eigenvalues for the region or voxel. The central moment matrix represents the spatial distribution of the splats in a given region or voxel around their centroid. More specifically, the central moment matrix may identify the dominant direction and spread of the splats in a given region or voxel, the eigenvectors may represent the directions where the splats spread out the most from the centroid, and the eigenvalues may represent the magnitude or amount by which the splats spread along each of the directions.

Splat generation system 100 replaces (at 108) the splats within each region or voxel with at least one substitute splat that is defined based on the eigenvectors and/or eigenvalues of that region's or voxel's central moment matrix. In particular, splat generation system 100 aligns the substitute splat according to the eigenvectors and scales the substitute splat based on the eigenvalue values. In this manner, splat generation system 100 generates the substitute splat to have the same orientation and general shape as the cluster or set of splats that are replaced by the substitute splat. In some embodiments, splat generation system 100 aligns the substitute splat according to the principal eigenvector in the central moment matrix that represents the dominant geometric direction for the splats in the corresponding region or voxel. In some such embodiments, splat generation system 100 may use the second and third eigenvectors or minor axes to define the shape of the substitute splat. In some other such embodiments, splat generation system 100 may generate additional substitute splats that align with the other eigenvectors (e.g., the second and third eigenvectors) of the central moment matrix. Splat generation system 100 may define the visual parameters (e.g., opacity, color, spherical harmonics, etc.) for the substitute splat based on an average or weighted average of the visual attributes of the splats that are replaced by that substitute splat.

Splat generation system 100 generates (at 110) the splat representation at a reduced LoD based on the substitute splats that are defined in each region or voxel of a particular partitioning of the 3D space. Splat generation system 100 may stream the splat representation at the reduced LoD in response to a request for the 3D content or the splat representation.

The moment-based generation produces the splat representations at the different LoDs with less structural or positional loss and greater overall structurally accuracy than when the splat representations at the different LoDs are generated by simply merging or combining two or more neighboring splats as a different method of defining the substitute splats. In particular, the two or more neighboring splats may have entirely different orientations and/or shapes. Merging these two or more neighboring splats by averaging their positional parameters together produces a substitute splat with an orientation and shape that varies significantly from the orientation and shape of the replaced neighboring splats. However, the moment-based generation of the substitute splats ensures that the substitute splats are aligned according to the principal axis of distribution for the splats in each voxel based on the eigenvectors and that the shape of the substitute splats matches the spread of the splats in each voxel based on the eigenvalues. Consequently, the substitute splats defined from the eigen-decomposition of the central moment matrix on a voxel-by-voxel basis preserves the structural detail and accuracy of the replaced set of splats while significantly reducing the encoded data and/or size for each generated LoD.

Figure 2:
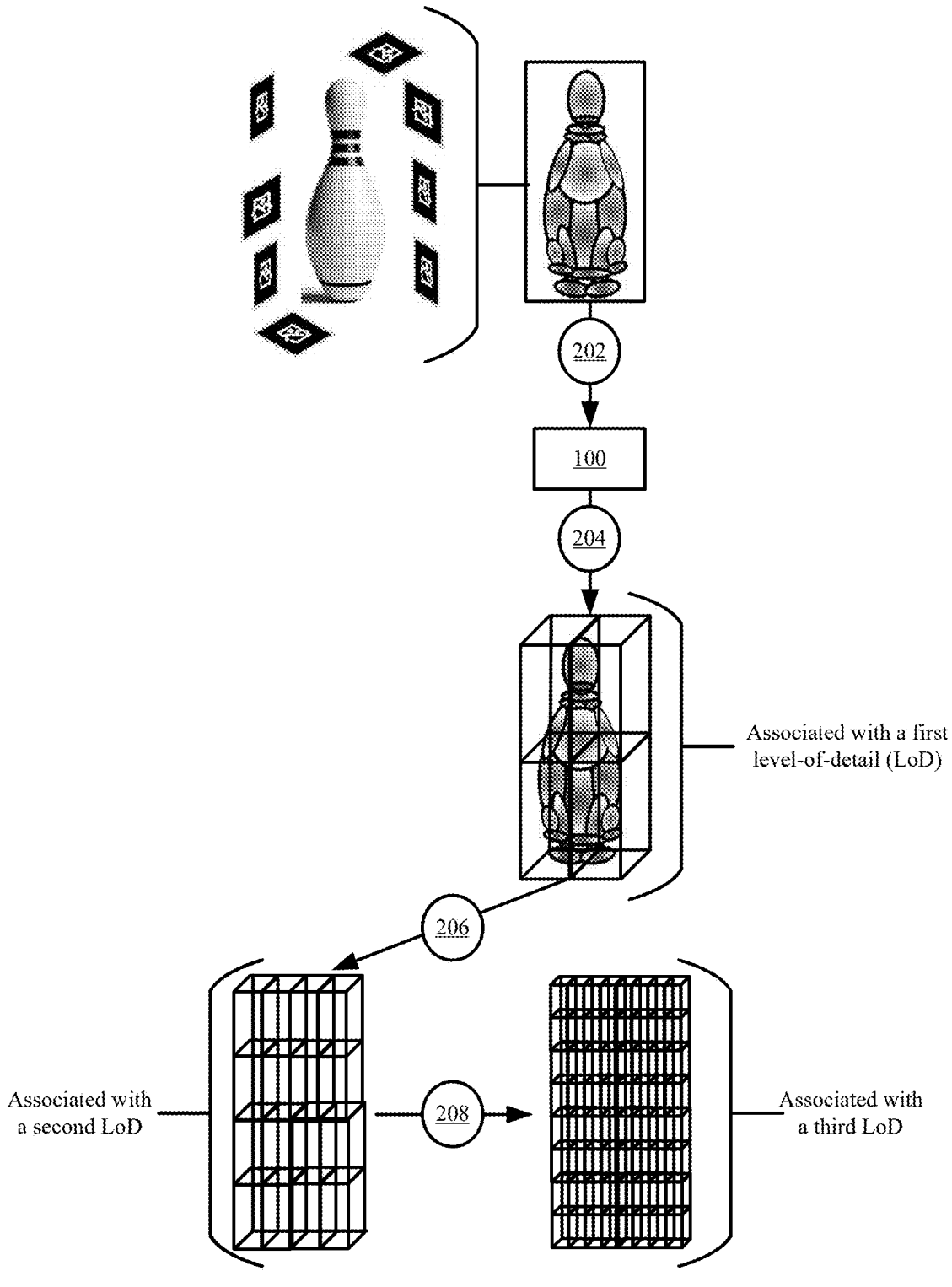
FIG. 2 illustrates a partitioning of the splat representation for the analytic non-iterative generation of different LoDs in accordance with some embodiments presented herein.

FIG. 2 illustrates a partitioning of the splat representation for the analytic non-iterative generation of different LoDs in accordance with some embodiments presented herein. Splat generation system 100 receives (at 202) the high-resolution splat representation from which the lower LoD encodings are to be generated.

Splat generation system 100 segments (at 204) the 3D space into a first set of regions or voxels for generation of the splat representation at a first LoD. In some embodiments, splat generation system 100 performs a uniform segmentation (at 204) of the 3D space into equal sized volumes. In some other embodiments, splat generation system 100 segments (at 204) the 3D space into unequal sized volumes based on the distribution of splats. For instance, splat generation system 100 may segment (at 204) the 3D space into different sized or shaped volumes with each volume encompassing an equal number of splats.

Splat generation system 100 further segments (at 206) each of the first set of regions or voxels into smaller and smaller sized regions or voxels. For instance, the first set of regions May partition the 3D space into 4 equal sized volumes and splat generation system 100 may further segment (at 204 and at 206) each of the 4 equal sized volumes into 4 equal sized smaller volumes for a total of 16 volumes. Splat generation system 100 may continue with the hierarchical segmentation until the voxels contain fewer than a threshold number of splats (e.g., three splats) or the size of the voxels hits a minimum threshold size.

Each partitioning or segmentation of the splat representation 3D space may be used to generate the substitute splats for the splat representation at a different LoD. More specifically, splat generation system 100 segments the 3D space into the different sized regions or voxels in order to create a hierarchical representation of the 3D space or the original splat representation from which the different LoD encodings may be generated. In some embodiments, splat generation system 100 defines an octree, K-dimensional tree, or other tree-based representation for the splat representation based on the segmentation of the splat representation 3D space into the different sized regions or voxels. Splat generation system 100 may define different LoD encodings of the splat representation based on the different segmentation of the 3D space represented by the different layers of the tree-based representation.

Figure 3:
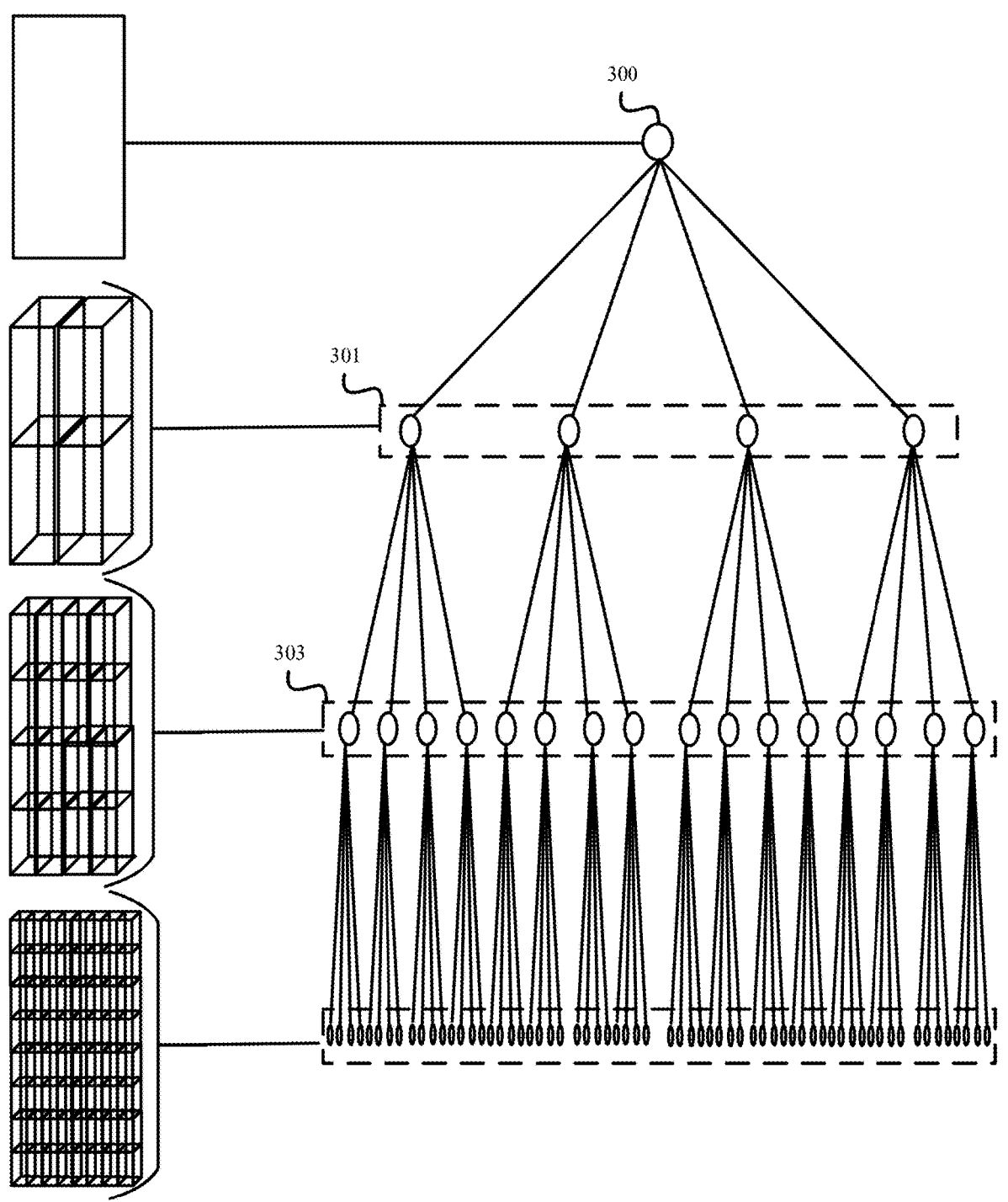
FIG. 3 illustrates a tree-based representation for a hierarchical segmentation of a splat representation in accordance with some embodiments presented herein.

FIG. 3 illustrates a tree-based representation for a hierarchical segmentation of a splat representation in accordance with some embodiments presented herein. Each layer of tree-based representation 300 maps to a different segmentation of the splat representation 3D space. For instance, first layer 301 under the root node corresponds to a first segmentation of the 3D space with a first set of large voxels and second layer 303 under first layer 301 corresponds to a second segmentation of each voxel from the first set of large sized voxels into a second set of smaller sized voxels.

Splat generation system 100 may directly generate the different LoDs from the original high-resolution splat representation based on the moment-based substitution of the splats within each region or voxel in a given layer of the tree-based representation. The moment-based substitution performed for a lower layer of the tree-based representation (e.g., closer to the leaf nodes than the root node) generates the splat representation at a first LoD with lesser loss relative to the original high-resolution splat representation, whereas the moment-based substitution performed for a higher layer of the tree-based representation (e.g., closer to the root node than the leaf nodes) generates the splat representation at a second LoD with greater loss relative to the original high-resolution splat representation or the first LoD.

Figure 4:
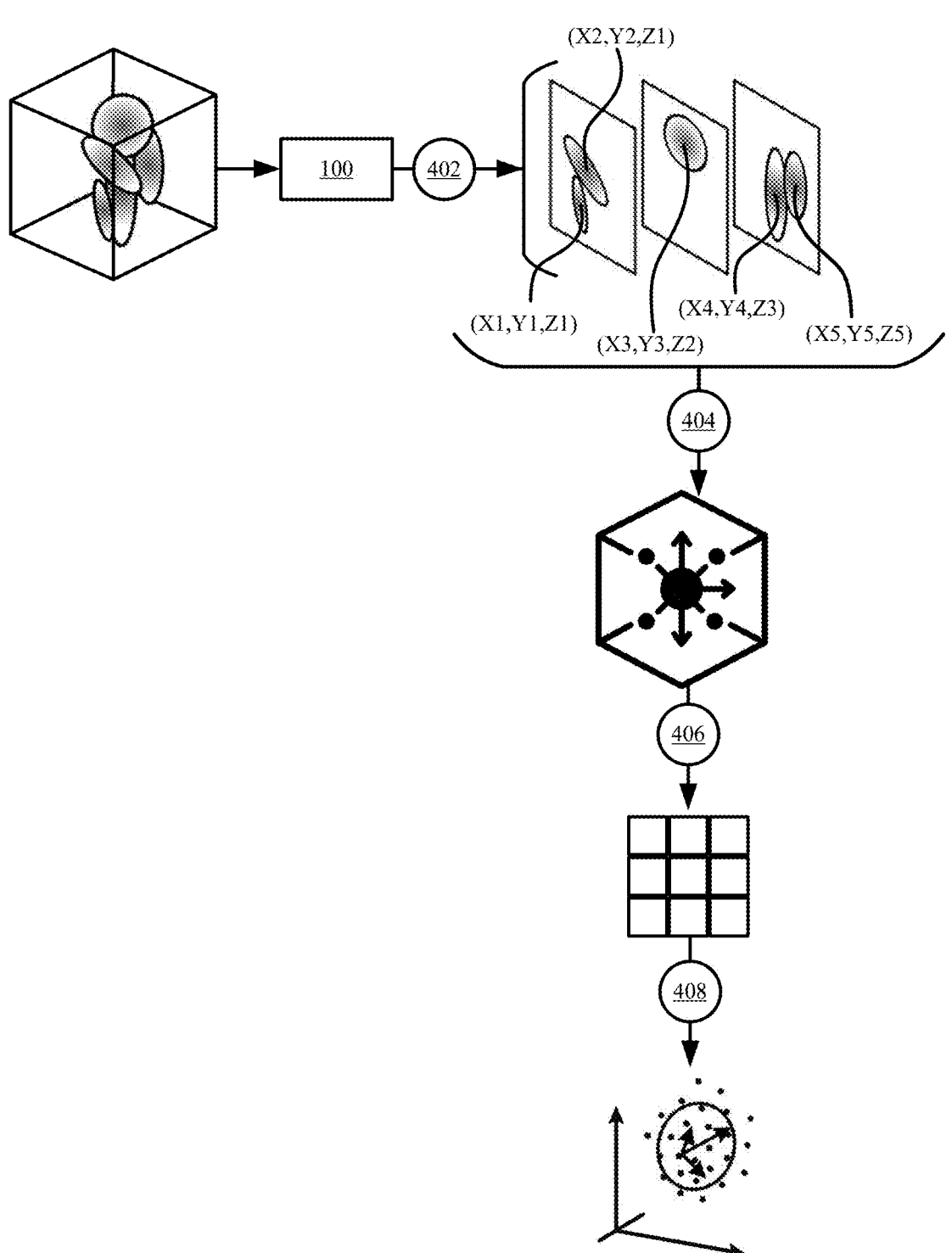
FIG. 4 illustrates an example of generating the central moment matrix for the splats in a given voxel in accordance with some embodiments presented herein.

FIG. 4 illustrates an example of generating the central moment matrix for the splats in a given voxel in accordance with some embodiments presented herein. To generate the central moment matrix, splat generation system 100 determines (at 402) the position of each splat in the voxel. In some embodiments, the splats may be sorted based on their color values prior to the splat positional determination (at 402). Other splat attributes (e.g., the splat opacity, size, etc.) may be used to assign different weights to the splats. For instance, a greater weight may be assigned to splats with more opacity to emphasize the visually dominant splats in the voxel.

Splat generation system 100 computes (at 404) the weighted centroid for the voxel based on the splat positions and/or assigned weights. For instance, the voxel's weighted centroid may be represented as:

$$\mu = [\mu_x, \mu_y; \mu_z] = (1/W)\sum_{i=1}^{n} w_i[x_i; y_i; z_i]$$

W represents the normalized total weight and $w_i$ represents the weights assigned to a splat with a position $x_i$, $y_i$, and $z_i$.

Splat generation system 100 generates (at 406) the central moment matrix for the splat distribution around the weight centroid. For instance, the central moment matrix may be represented as:

$$M = (1/W) * \sum\_(i = 1)^{\wedge}nw\_i * (p\_i - \mu)(p\_i - \mu)^{\wedge}T = [[m\_xx,$$

$$m\_xy, m\_xz], [m\_yx, m\_yy, m\_yz], [m\_zx, m\_zy, m\_zz]]$$

M is the 3×3 central moment matrix and represents the total variance or spread of the splats in the voxel, W is the total weight of all splats in the voxel, $p_i$ are the splat positions, and $\mu$ is the weighted centroid. Each element m_xx, m_xy, m_xz, etc., represents a component of the covariance describing spatial variance of splat positions along different axes.

Splat generation system 100 performs (at 408) an eigen-decomposition of the central moment matrix. The eigen-decomposition identifies the eigenvectors (e.g., splat directions) and eigenvalues (e.g., variation along each direction) or the main axes of the splat cluster within a given voxel (e.g., the longest, middle, and shortest directions of the spread). The eigen-decomposition converts the numeric central moment matrix into a geometric description for the orientation and size of the splat cluster within the voxel.

Splat generation system 100 may define one or more substitute splats based on the weighted centroid and the geometric description that is derived from the eigen-decomposition of the central moment matrix. Splat generation system 100 may define a single substitute splat to replace or represent all the splats in the voxel. The center of the substitute splat is the weighted average position or the calculated centroid. The orientation of the substitute splat is defined from the eigenvectors and is in the same direction as the principal axis of distribution. The size or radius of the substitute splat along each axis is defined from the eigenvalues. The substitute splat has the same overall shape and direction as the splats of the voxel, thereby preserving the geometric structure of the splats within each voxel and the geometric structure of the 3D content that is partitioned to the different voxels.

Figure 5:
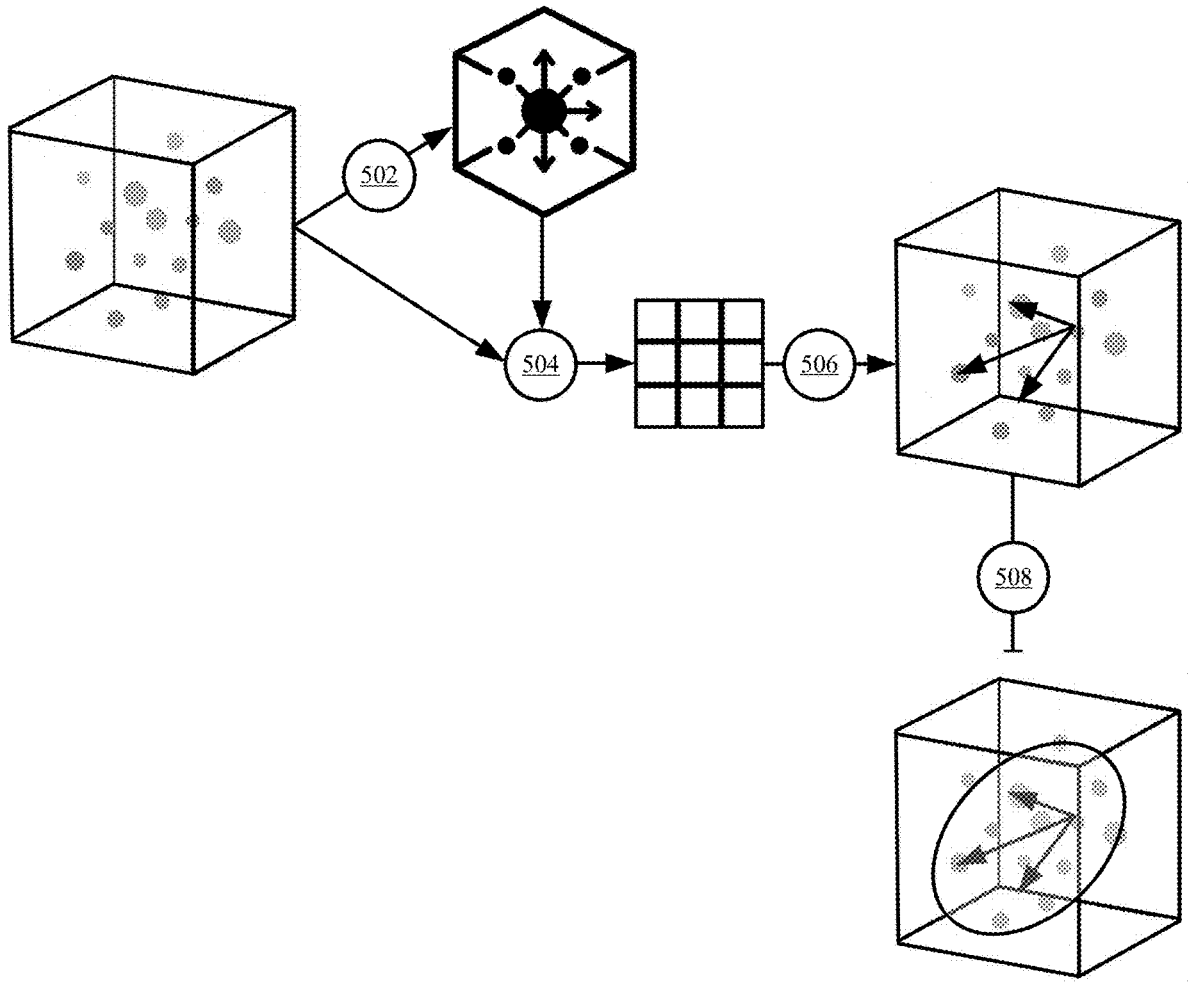
FIG. 5 illustrates an example of generating a substitute splat to represent the splats in a voxel based on the centroid and eigen-decomposition of the voxel's central moment matrix in accordance with some embodiments presented herein.

FIG. 5 illustrates an example of generating a substitute splat to represent the splats in a voxel based on the centroid and eigen-decomposition of the voxel's central moment matrix in accordance with some embodiments presented herein. Splat generation system 100 computes (at 502) the centroid for the splats in a voxel and encodes (at 504) the spatial distribution and orientation of the splats in a moment matrix. In particular, the moment matrix is defined as the weighted second-order moments of the splats relative to the centroid.

Splat generation system 100 performs (at 506) the eigen-decomposition of the moment matrix to find the eigenvectors or the directions in which the splats vary the most and the eigenvalues or how much the splats vary along each of the directions. The eigen-decomposition of a 3×3 moment matrix yields 3 eigenvectors with each eigenvector being perpendicular to the others. The 3 eigenvectors may represent the x, y, and z axes of the substitute splat. Each eigenvector is associated with an eigenvalue that specifies the length of the substitute splat along each axis.

Splat generation system 100 defines (at 508) the substitute splat based on the centroid, eigenvectors, and eigenvalues. Splat generation system 100 centers the substitute splat at the position associated with the centroid, orients the substitute splat according to the eigenvectors, and scales or sizes the substitute splat according to the eigenvalues.

The real-time generation of the splat representation at the different LoDs is facilitated by the partitioning of the splat representation 3D space into the different voxels. In particular, the eigen-decomposition of each voxel and the definition of the substitute splat for each voxel may be computed in parallel using different GPU or processor processes, threads, or compute units. For instance, a first GPU compute unit may be used to compute the centroid, central moment matrix eigen-decomposition, and substitute splat definition for a first voxel associated with the splat representation at a particular LoD and a second GPU compute unit may be used to compute the centroid, central moment matrix eigen-decomposition, and substitute splat definition for a second voxel associated with the same splat representation at the particular LoD. Accordingly, the splats in the different voxels associated with the particular LoD may be processed in parallel and the substitute splats for the different voxels may be generated in parallel based on the number of processes, threads, or compute units supported by processors or GPUs of splat generation system 100.

FIG. 6 presents a process 600 for generating a splat representation at a lower LoD in accordance with some embodiments presented herein. Process 600 is implemented by splat generation system 100.

Splat generation system 100 includes one or more devices or machines with processor, memory, storage, network, and/or other hardware resources that are configured to generate different LoDs encodings of a splat representation in less time and/or using fewer resources than traditional iterative splat training techniques. Splat generation system 100 may be part of a 3D graphics system or 3D rendering engine. For instance, splat generation system 100 may be integrated in a 3D gaming device, a 3D streaming platform, and/or other provider of spatial computing experiences.

Process 600 includes receiving (at 602) a splat representation of a 3D asset or 3D content. In some embodiments, the 3D asset or 3D content may be originally defined with primitives of another 3D format. For instance, the original 3D asset or 3D content may be originally encoded with meshes for a mesh encoding, points for a point cloud encoding, or other primitives of a 3D format other than a 3D Gaussian splat format. In some such embodiments, the splat representation is generated from converting the primitives of the 3D asset or 3D content to the splats of the splat representation. In some other embodiments, the 3D asset or 3D content is a physical object or scene that is imaged or captured from different viewpoints, angles, or perspectives. The captured images of the 3D asset or 3D content may be used to generate the splat representation. For instance, the received (at 602) splat representation may be generated based on a traditional iterative splat training technique that receives the captured images as inputs and that performs different splat generation iterations until the generated set of splats reconstruct the structure and visual detail in the images with a threshold degree of accuracy. In any case, the splat representation is defined by a distributed set of semi-transparent ellipsoids or splats that are distributed across a 3D space and layered over one another to reconstruct the structure and detail of the 3D asset or 3D content. The splats may correspond to Gaussians that are defined with a position or coordinate in the 3D space, a covariance matrix that defines the shape and orientation of the splat, spherical harmonics that define colors and/or other visual characteristics of the splat, and an opacity or alpha value for the splat transparency. The splats may be defined with other parameters or attributes.

Process 600 includes partitioning (at 604) the 3D space of the splat representation into volumetric subregions or voxels. The partitioning (at 604) may include dividing the 3D space using one or more volumetric grid structures. In some embodiments, the partitioning (at 604) may include subdividing the voxels produced from a first partitioning into smaller and smaller sets of voxels for subsequent partitionings. In some such embodiments, each voxel may be subdivided into a set of two or more smaller sized voxels and the subdividing may be repeated on the two or more smaller sized voxels until the voxels reach a minimum size or contain a threshold number of splats. The different sized voxels associated with a different partitioning (at 604) may be used to generate the splat representation at different LoDs.

Process 600 includes defining (at 606) a tree-based representation of the splat representation based on the partitioning (at 604) of the 3D space. The nodes at each level of the tree-based representation may correspond to the voxels of a particular size generated from a particular partitioning (at 604) of the 3D space. More specifically, the nodes at each lower level of the tree-based representation may correspond to smaller and smaller sized voxels that are generated from a further subdividing of the voxels represented at the next higher level of the tree-based representation.

Process 600 includes determining (at 608) the centroid or central moment for the splats in each voxel. The centroid or central moment for a given voxel may be determined (at 608) from analyzing the positions of the splats in that voxel. In some embodiments, determining (at 608) the centroid or central moment may include defining a central moment matrix based on the splat positions and/or weighting assigned to the splats in each voxel. The weights may be assigned based on values of the non-positional splat parameters (e.g., opacity, splat area, etc.) and/or determined based on the visual contribution of each splat to the voxel.

Process 600 includes performing (at 610) an eigen-decomposition of each voxel's central moment. The eigen-decomposition solves the central moment matrix and/or converts the raw distribution of splats in a voxel to a geometric summary that includes eigenvectors defining the orientation of splats in the voxel and eigenvalues defining the spread of the splats in the voxel.

Process 600 includes defining (at 612) a substitute splat for each particular voxel based on the eigenvectors and eigenvalues derived from the eigen-decomposition of the particular voxel's central moment matrix. The substitute splat defined (at 612) for a particular voxel represents and replaces the subset of splats from the splat representation that are positioned in the particular voxel. Defining (at 612) the substitute splat includes defining the center position of the substitute splat based on the computed centroid for the splats in the voxel, defining the orientation of the substitute splat to match the direction or orientation of the splats in the voxel based on the eigenvectors, and defining the shape and scale of the substitute splat to match the overall shape formed by the splats of the voxel based on the eigenvalues. In this manner, the substitute splat represents the structure formed by the splats in the voxel accurately and with less loss than defining the position, orientation, and shape of the substitute splat by merging or averaging neighboring splats in order to generate the substitute splat.

Process 600 includes defining (at 614) the visual characteristics for each substitute splat based on the visual characteristics of the splats that are replaced by that substitute splat in a given voxel. In some embodiments, splat generation system 100 defines (at 614) the visual characteristics for a substitute splat of a particular voxel by averaging or a weighted averaging of the visual characteristics of the splats in that particular voxel. For instance, splat generation system 100 may define (at 614) the color values or spherical harmonics for the substitute splat by averaging or calculating a weighted average of the color values or spherical harmonics of the splats in the particular voxel. The weighted average may include assigning a higher weight to or calculating a larger color contribution from splats that occupy a greater area or volume within the particular voxel and/or splats that have greater opacity and less transparency. Splat generation system 100 may define (at 614) the opacity of the substitute splat by determining the cumulative opacity of the splats in the particular voxel. For instance, splat generation system 100 calculates the cumulative average opacity of different splats that are layered over another at different parts of the particular voxel and defines (at 614) the opacity of the substitute splat based on the cumulative average opacity. Other techniques may be used to define (at 614) the substitute splat visual characteristics. For instance, the substitute splat opacity may be defined based on the mean or weighted mean of the replaced splat opacities. Moreover, splat generation system 100 may adjust the visual characteristics based on a perceptual adjustment that includes rendering the substitute splat and the set of splats replaced by the substitute splat, comparing the resulting visualizations, and adjusting the visual characteristics of the substitute splat to minimize the perceptual loss between the visualizations. The visual characteristics correspond to the colors, opacity, reflectivity, spherical harmonics, and/or other splat parameters that contribute to the visualization or rendering of a splat.

Process 600 includes associating (at 616) the substitute splats that are generated for voxels of a particular size to a layer or level of the tree-based representation with nodes mapping to the voxels of the particular size. More specifically, each node of the tree-based representation maps to a voxel of a specific size and the substitute splat that is generated for the splats of that voxel may be linked back to the corresponding node in the tree-based representation such that each node at a particular level or layer of the tree-based representation is associated with a different substitute splat for the splat representation at a specific LoD. Accordingly, the different layers or levels of the tree-based representation map to the different LoD encodings of the splat representation.

Process 600 includes presenting (at 618) the substitute splats that are associated with a particular LoD in response to a request for the splat representation or the 3D asset or 3D content that is represented by the splat representation. Splat generation system 100 presents (at 618) the substitute splats for the particular LoD in order to provide the requesting device with a visualization of the splat representation with minimal delay or latency. For instance, splat generation system 100 selects and presents (at 618) the substitute splats for the particular LoD that allows a visualization of the splat representation to be generated within a second of the request being issued such that there is no visible or meaningful lag between when the request is issued and when the visualization is presented on the requesting device.

In some embodiments, presenting (at 618) the substitute splats includes rendering the substitute splats to generate a visualization of the 3D asset or 3D content at the LoD associated with the substitute splats. In some embodiments, presenting (at 618) the substitute splats includes streaming the data associated with the substitute splats over a data network from splat generation system 100 to the requesting device over a data network without streaming the original primitive data of the 3D asset or 3D content and without streaming the splat data for the replaced splats of the received (at 602) splat representation.

In some embodiments, splat generation system 100 may associate each LoD encoding of the splat representation or each layer of the tree-based representation to different network and/or compute performance parameters. For instance, a first LoD encoding may be associated with a first range of network performance (e.g., network bandwidth and/or latency) when the first LoD encoding may be streamed in a threshold amount of time (e.g., less than one second) using the first range of network performance, and a second LoD encoding may be associated with a second range of network performance when the second LoD encoding may be streamed in the threshold amount of time using the second range of network performance. Similarly, a first LoD encoding may be associated with a first range of compute performance and a second LoD encoding may be associated with a second range of compute performance, wherein the compute performance may be determined based on the available processing and/or memory resources of the requesting device.

Figure 7:
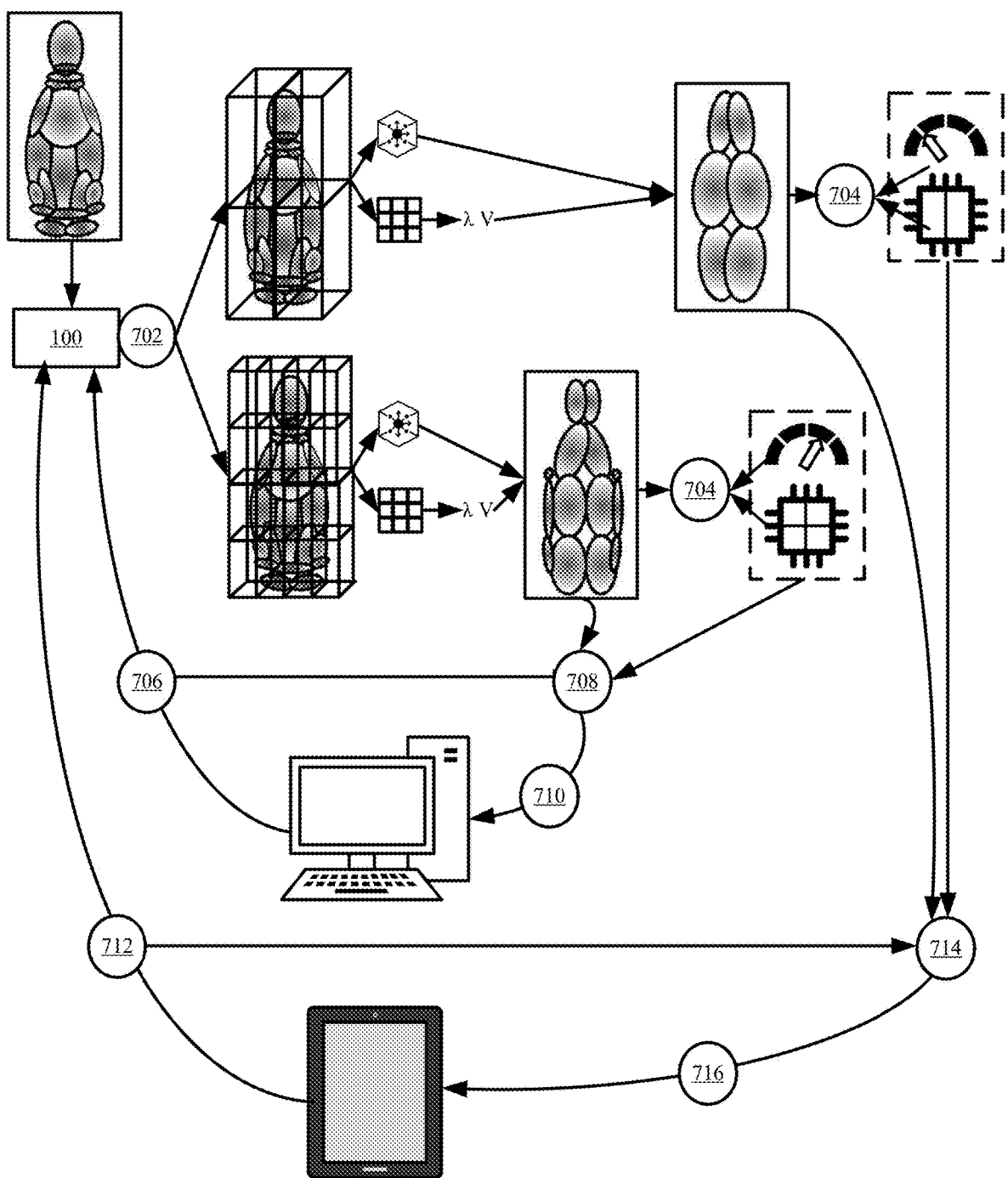
FIG. 7 illustrates an example of distributing a splat representation at different LoDs to different requesting devices in accordance with some embodiments presented herein.

FIG. 7 illustrates an example of distributing a splat representation at different LoDs to different requesting devices in accordance with some embodiments presented herein. Splat generation system 100 generates (at 702) the substitute splats for the different LoD encodings based on the centroid calculation and eigen-decomposition of the central moment matrix for voxels of different sizes.

Splat generation system 100 associates (at 704) the different LoD encodings to different network and/or compute performance parameters that enable a real-time experience or other custom-defined user experience for the splat representation at each LoD. The custom-defined user experience may be defined in terms of a maximum amount of latency, delay, or buffering for receiving, presenting, and/or interacting with the splat representation.

Splat generation system 100 receives (at 706) a first request for the splat representation from a first device over a first network connection. Splat generation system 100 determines (at 708) the network performance associated with the first network connection and/or the compute performance of the first device. Splat generation system 100 determines (at 708) the network performance by monitoring the bandwidth, latency, packet loss, jitter, and/or other performance parameters associated with the first network connection. Splat generation system 100 determines (at 708) the compute performance based on metadata or other identifying information provided by the first device when establishing the first network connection or with the request for the splat representation. For instance, the identifying information may identify the processor or GPU of the first device, available memory, and/or a 3D rendering performance metric.

Splat generation system 100 selects and streams (at 710) the substitute splats that are generated for the splat representation at a first LoD and that are associated with the determined (at 708) network and/or compute performance. Splat generation system 100 streams (at 710) the substitute splats to the first device. The first device may load the substitute splats into memory and generate a visualization of the splat representation at the first LoD by rendering the substitute splats.

Splat generation system 100 receives (at 712) a second request for the splat representation from a second device over a second network connection. Splat generation system 100 determines (at 714) the network performance associated with the second network connection and/or the compute performance of the second device.

Splat generation system 100 selects and streams (at 716) the substitute splats that are generated for the splat representation at a second LoD and that are associated with the determined (at 714) network and/or compute performance. Splat generation system 100 streams (at 716) the substitute splats to the second device, and the second device may load the substitute splats into memory and generate a visualization of the splat representation at the second LoD by rendering the substitute splats.

Figure 8:
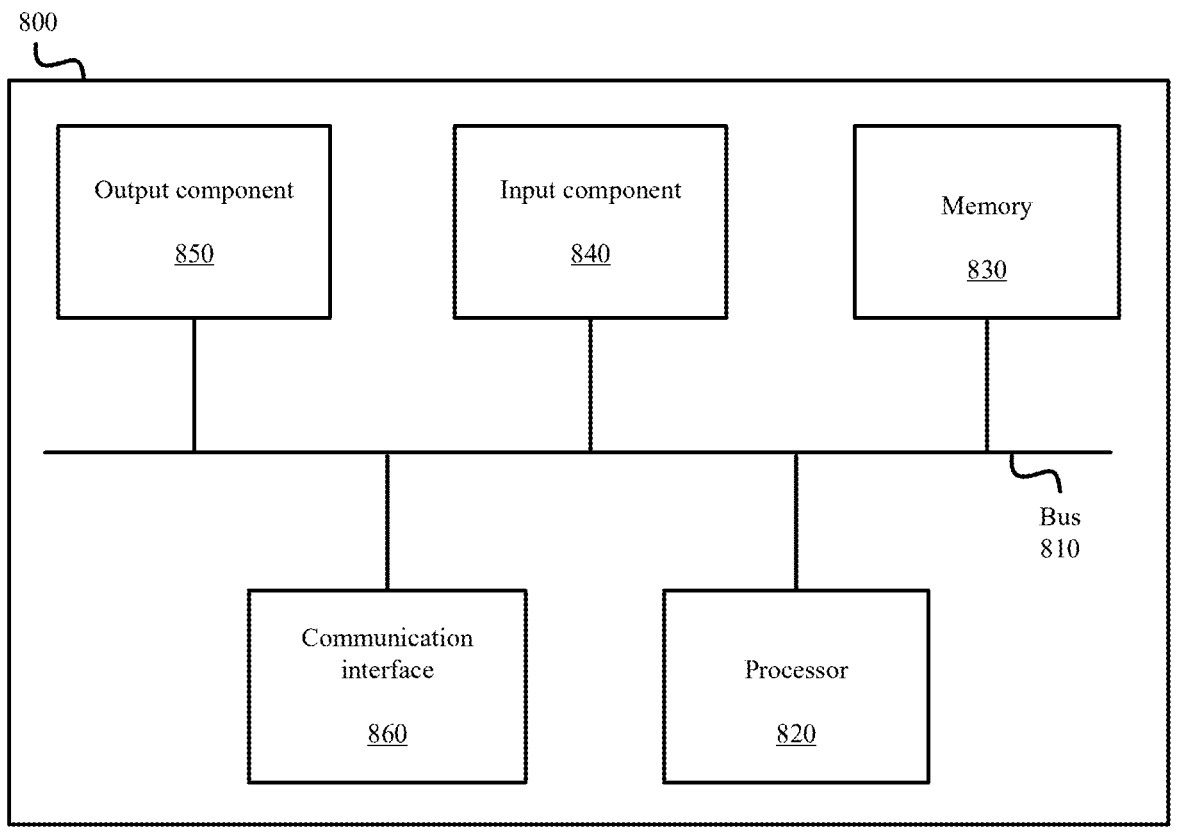
FIG. 8 illustrates example components of one or more devices, according to one or more embodiments described herein.

FIG. 8 is a diagram of example components of device 800. Device 800 may be used to implement one or more of the tools, devices, or systems described above (e.g., splat generation system 100). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

receiving a splat representation of a three-dimensional (3D) asset, the splat representation comprising a plurality of splats distributed in a 3D space;

partitioning the 3D space into a plurality of voxels;

determining one or more directions and amounts with which a set of splats from the plurality of splats positioned within a voxel of the plurality of voxels spread out from a centroid that is derived based on positions of the set of splats;

defining a substitute splat for each particular voxel of the plurality of voxels based on the one or more directions and amounts that are determined for the set of splats in that particular voxel; and generating the splat representation at a reduced level-of-detail (LoD) based on the substitute splat that is defined for each voxel of the plurality of voxels.

2. The method of claim 1 further comprising:

defining a central moment matrix for each specific voxel of the plurality of voxels based on a spatial distribution of the set of splats positioned within the specific voxel; and wherein determining the one or more directions and amounts comprises performing an eigen-decomposition of the central moment matrix that is defined for each specific voxel of the plurality of voxels.

3. The method of claim 1 further comprising:

defining a central moment matrix for a specific voxel from the plurality of voxels based on a spatial distribution of the set of splats positioned within the specific voxel;

calculating the one or more directions for the set of splats associated with the specific voxel based on eigenvectors that are derived from the central moment matrix that is defined for the specific voxel; and calculating the amounts for the set of splats associated with the specific voxel based on eigenvalues that are derived from the central moment matrix that is defined for the specific voxel.

4. The method of claim 1, wherein defining the substitute splat for each particular voxel comprises:

centering the substitute splat at the centroid that is derived for the particular voxel;

orienting the substitute splat according to the one or more directions with which the set of splats within the particular voxel spread out from the centroid; and scaling the substitute splat based on the amounts associated with the one or more directions.

5. The method of claim 1, wherein defining the substitute splat for each particular voxel comprises:

replacing the set of splats positioned within the particular voxel with the substitute splat that is defined for the particular voxel.

6. The method of claim 1, wherein defining the substitute splat for each particular voxel comprises:

scaling the substitute splat to encompass regions of the particular voxel that are spanned by the set of splats.

7. The method of claim 1, wherein defining the substitute splat for each particular voxel comprises:

defining visual characteristics of the substitute splat based on an average or weighted average of visual characteristics from the set of splats in the particular voxel.

8. The method of claim 1 further comprising:

processing each voxel of the plurality of voxels in parallel using a different process, thread, or compute unit of a hardware processor.

9. The method of claim 1 further comprising:

receiving a request for the splat representation or the 3D asset; and streaming the substitute splat that is defined for each voxel of the plurality of voxels in order to provide the splat representation at the reduced LoD in response to the request.

10. The method of claim 1 further comprising:

generating a visualization of the splat representation at the reduced LoD in response to rendering the substitute splat that is defined for each voxel of the plurality of voxels instead of the plurality of splats.

11. The method of claim 1 further comprising:

partitioning each voxel of the plurality of voxels into a smaller set of voxels;

determining one or more directions and amounts with which a subset of splats positioned within a voxel of the smaller set of voxels spread out from a centroid that is derived based on positions of the subset of splats;

defining a substitute splat for each particular voxel of the smaller set of voxels based on the one or more directions and amounts that are determined for the subset of splats in that particular voxel; and generating the splat representation at a second LoD based on the substitute splat that is defined for each voxel of the smaller set of voxels.

12. A splat generation system comprising:

one or more hardware processors configured to:

receive a splat representation of a three-dimensional (3D) asset, the splat representation comprising a plurality of splats distributed in a 3D space;

partition the 3D space into a plurality of voxels;

determine one or more directions and amounts with which a set of splats from the plurality of splats positioned within a voxel of the plurality of voxels spread out from a centroid that is derived based on positions of the set of splats;

define a substitute splat for each particular voxel of the plurality of voxels based on the one or more directions and amounts that are determined for the set of splats in that particular voxel; and generate the splat representation at a reduced level-of-detail (LoD) based on the substitute splat that is defined for each voxel of the plurality of voxels.

13. The splat generation system of claim 12, wherein the one or more hardware processors are further configured to:

define a central moment matrix for each specific voxel of the plurality of voxels based on a spatial distribution of the set of splats positioned within the specific voxel; and wherein determining the one or more directions and amounts comprises performing an eigen-decomposition of the central moment matrix that is defined for each specific voxel of the plurality of voxels.

14. The splat generation system of claim 12, wherein the one or more hardware processors are further configured to:

define a central moment matrix for a specific voxel from the plurality of voxels based on a spatial distribution of the set of splats positioned within the specific voxel;

calculate the one or more directions for the set of splats associated with the specific voxel based on eigenvectors that are derived from the central moment matrix that is defined for the specific voxel; and calculate the amounts for the set of splats associated with the specific voxel based on eigenvalues that are derived from the central moment matrix that is defined for the specific voxel.

15. The splat generation system of claim 12, wherein defining the substitute splat for each particular voxel comprises:

centering the substitute splat at the centroid that is derived for the particular voxel;

orienting the substitute splat according to the one or more directions with which the set of splats within the particular voxel spread out from the centroid; and scaling the substitute splat based on the amounts associated with the one or more directions.

16. The splat generation system of claim 12, wherein defining the substitute splat for each particular voxel comprises:

replacing the set of splats positioned within the particular voxel with the substitute splat that is defined for the particular voxel.

17. The splat generation system of claim 12, wherein defining the substitute splat for each particular voxel comprises:

scaling the substitute splat to encompass regions of the particular voxel that are spanned by the set of splats.

18. The splat generation system of claim 12, wherein defining the substitute splat for each particular voxel comprises:

defining visual characteristics of the substitute splat based on an average or weighted average of visual characteristics from the set of splats in the particular voxel.

19. The splat generation system of claim 12, wherein the one or more hardware processors are further configured to:

process each voxel of the plurality of voxels in parallel using a different process, thread, or compute unit of the one or more hardware processors.

20. A non-transitory computer-readable medium storing instructions that, when executed by one or more processors of a splat generation system, cause the splat generation system to perform operations comprising:

receiving a splat representation of a three-dimensional (3D) asset, the splat representation comprising a plurality of splats distributed in a 3D space;

partitioning the 3D space into a plurality of voxels;

determining one or more directions and amounts with which a set of splats from the plurality of splats positioned within a voxel of the plurality of voxels spread out from a centroid that is derived based on positions of the set of splats;

defining a substitute splat for each particular voxel of the plurality of voxels based on the one or more directions and amounts that are determined for the set of splats in that particular voxel; and generating the splat representation at a reduced level-of-detail (LoD) based on the substitute splat that is defined for each voxel of the plurality of voxels.

\*  \*  \*  \*  \*